United States Patent
Cheryan

(10) Patent No.: US 7,569,671 B2
(45) Date of Patent: Aug. 4, 2009

(54) METHOD AND SYSTEM FOR CORN FRACTIONATION

(75) Inventor: Munir Cheryan, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 11/327,166

(22) Filed: Jan. 6, 2006

(65) Prior Publication Data

US 2006/0173169 A1 Aug. 3, 2006

Related U.S. Application Data

(60) Provisional application No. 60/641,664, filed on Jan. 6, 2005.

(51) Int. Cl.
 C07K 1/14 (2006.01)
 C07K 1/34 (2006.01)
 C07K 1/36 (2006.01)
 C07K 14/425 (2006.01)

(52) U.S. Cl. .................. 530/376; 530/370; 530/412; 530/414; 530/418; 530/422; 530/424

(58) Field of Classification Search .............. 530/373; 426/601
See application file for complete search history.

(56) References Cited

U.S. PATENT DOCUMENTS

| | | | |
|---|---|---|---|
| 3,962,335 A | 6/1976 | Kumar | |
| 3,963,575 A | 6/1976 | Bulich | |
| 4,093,540 A | 6/1978 | Sen Gupta | |
| 4,224,219 A | 9/1980 | Van Blanton et al. | |
| 4,414,157 A | 11/1983 | Iwama et al. | |
| 4,486,353 A | 12/1984 | Matsuzaki et al. | |
| 4,545,940 A | 10/1985 | Mutoh et al. | |
| 4,624,805 A | 11/1986 | Lawhon | |
| 4,716,218 A | 12/1987 | Chen et al. | |
| 4,787,981 A | 11/1988 | Tanahashi et al. | |
| 5,077,441 A | 12/1991 | Kuk et al. | |
| 5,166,376 A | 11/1992 | Suzuki et al. | |
| 5,254,673 A | 10/1993 | Cook et al. | |
| 5,310,487 A | 5/1994 | LaMonica | |
| 5,342,923 A | 8/1994 | Takahashi et al. | |
| 5,367,055 A | 11/1994 | Takahashi et al. | |
| 5,410,021 A | 4/1995 | Kampen et al. | |
| 5,482,633 A | 1/1996 | Muralidhara et al. | |
| 5,510,463 A | 4/1996 | Takahashi et al. | |
| 5,545,329 A | 8/1996 | LaMonica | |
| 5,580,959 A | 12/1996 | Cook et al. | |
| 5,602,286 A | 2/1997 | Muralidhara | |
| 5,773,076 A | 6/1998 | Liaw et al. | |
| 5,968,585 A | 10/1999 | Liaw et al. | |
| 6,365,732 B1 | 4/2002 | Van Thorre | |
| 6,433,146 B1 | 8/2002 | Cheryan | |
| 7,045,607 B2 | 5/2006 | Cheryan | |
| 7,148,366 B2 | 12/2006 | Cheryan | |
| 2002/0183490 A1 | 12/2002 | Cheryan | |
| 2003/0176669 A1 | 9/2003 | Van Thorre | |
| 2007/0037993 A1 | 2/2007 | Cheryan | |

OTHER PUBLICATIONS

Campos, E.J., et al. 2002 Applied Biochemistry and Biotechnology 99(1-3): 553-576, Abstract (1 page).*
U.S. Appl. No. 11/801,223, filed May 8, 2007, Cheryan et al.
N. Singh, M. Cheryan, "Extraction of Oil from Corn Distillers Dried Grains with Solubles", *Transactions of the ASAE*, vol. 41, No. 6, pp. 1-3, 1998.
M. Cheryan, Ultrafiltration and Microfiltration Handbook, Lancaster, PA; Technomic Publishing Co. 1998.
D. Chang, M.P. Hojilla-Evangelista, L.A. Johnson, D.J. Myers, "Economic-Engineering Assessment of Sequential Processing of Corn", *Transactions of the ASAE*, vol. 38, No. 4, 1995, pp. 1129-1138.
J.T. Chien, J.E. Hoff, L.F. Chen, "Simultaneous Dehydration of 95% Ethanol and Extraction of Crude Oil from Dried Ground Corn", *Cereal Chem.*, vol. 65, No. 6, 1988, pp. 484-486.
J.T. Chien, J.E. Hoff, M.J. Lee, H.M. Lin, Y.J. Chen, L.F. Chen, "Oil Extraction of Dried Ground Corn with Ethanol", *Chemical Engineering Journal*, vol. 43, 1990, pp. B103-B113.
L.C. Dickey, M.F. Dallmer, E.R. Radewonuk, N. Parris, M. Kurantz, J.C. Craig, Jr.,."Hydrocyclone Separation of Dry-Milled Corn", *Cereal Chem*, vol. 74, No. 5, 1997, pp. 676-680.
M.P. Hojilla-Evangelista, L.A. Johnson, D.J. Myers, "Sequential Extraction Processing of Flaked Whole Corn: Alternative Corn Fractionation Technology with Ethanol Production", *Cereal Chem*, vol. 69, No. 6, 1992, pp. 643-647.

(Continued)

*Primary Examiner*—Maryam Monshipouri
*Assistant Examiner*—Marsha M Tsay
(74) *Attorney, Agent, or Firm*—Greer, Burns & Crain, Ltd.

(57) ABSTRACT

Methods and apparatus for processing corn into one or more corn products. Oil is extracted from corn or corn products or by-products with a solvent. The corn-solvent mixture is separated into streams, one of which preferably includes an extract containing at least oil and solvent, and another containing de-oiled corn solids and adsorbed solvent. The solvent is separated from oil, and the de-oiled, desolventized corn solids are processed to provide one or more corn products.

18 Claims, 2 Drawing Sheets

OTHER PUBLICATIONS

N. Singh, M. Cheryan, "Membrane Technology in Corn Wet Milling", *Cereal Foods World*, vol. 42, No. 7, 1997, pp. 520-525.

"Membrane Technology in Corn Refining and Bioproduct-Processing", Starch/Stärke, vol. 50, No. 1, 1998, pp. 16-23.

V. Singh, S.R. Eckhoff, "Effect of Soak Time, Soak Temperature and Lactic Acid on Germ Recovery Parameters", *Cereal Chem.*, vol. 73, No. 6, pp. 716-720, 1996.

Abstract of Funded Research, Fiscal Year 1997, (Cheryan, M. abstract No. 9701992) 1997, [on-line], [retrieved on Sep. 22, 2000]. Retrieved from the internet: <URL:http://www.reeusda.gov/nri/pubs/archive/abstracts/abstract97/contents.htm and http://www.reeu.

Cao, N., Zu, Q., Ni., J., Chen, L.F., "Enzymatic Hydrolysis of Corn Starch After Extraction of Corn Oil with Ethanol," Applied Biochemistry and Biotechnology. vol. 57-58, 1996, pp. 39-47.

Cicuttini, A., Kollacks, W.A. and Reckers, C.J.N. Reverse Osmosis Saves Energy and Water in Corn Wet Milling, Starke 35: 149-154, 1983.

Dorr-Oliver, Equipment and Systems for Corn Wet Milling from Dorr-Oliver brochure, Milford, CT, pp. 1-19, 1987.

Shukla, R., Tandon, R., Nguyen, M., and Cheryan, M., Microfiltration of Starch Suspensions Using a Tubular Stainless Steel Membrane, Membrane Technology (Elsevier), No. 120:5-8, 2000.

* cited by examiner

METHOD AND SYSTEM FOR CORN FRACTIONATION

PRIORITY CLAIM

This application claims the benefit of U.S. Provisional Application Ser. No. 60/641,664, filed Jan. 6, 2005, under 35 U.S.C. § 119.

FIELD OF THE INVENTION

The present invention relates generally to corn fractionation processes and equipment. The invention specifically concerns production of one or more corn products, such as industrial, food, feed, and/or kindred products, from corn.

BACKGROUND OF THE INVENTION

Dry milling, in which whole corn is ground or milled to produce products for feed and food uses, is a popular method in the art for processing corn. However, dry milling is typically restricted in its range of products, and it typically is not designed to separate the individual components of corn, except in certain methods wherein the corn is partially degerminated prior to milling.

Another method of processing corn is the dry-grind ethanol process, which conventionally includes dry-grinding whole corn, and adding enzymes and yeast to the cooked corn to produce primarily fuel ethanol. Yet another method is corn wet milling, which produces corn oil, corn gluten feed, corn gluten meal, starch, fiber, and corn steep liquor.

Conventional dry-grind and wet milling have limitations. For example, products of conventional dry-grind ethanol processing typically are limited to ethanol, carbon dioxide, and distillers dried grains with solubles (DDGS). Of these products, DDGS is a low-value animal feed, carbon dioxide has an even lower value and is often merely discharged to the atmosphere, and ethanol, if used for fuel, competes unfavorably with low-priced petroleum products. Thus, the dry-grind ethanol industry presently needs government subsidies and tax waivers, which are likely to be eliminated, for economic survival.

In wet milling, corn is first soaked in water (steeped) for several hours prior to undergoing a series of grinding and separation steps that result in one or more of several products such as corn oil, starch, corn gluten feed, corn gluten meal, fiber, and corn steep liquor. Corn wet milling produces a multitude of high value products, but requires high capital investments in plant and machinery. It also requires large amounts of water, typically 5-9 gallons per bushel of corn, primarily for the purification of starch and for steeping.

The required steeping of corn in conventional wet milling is time-consuming. For typical steeping, corn is soaked in water at about 50° C. and for 22-50 hours. Sulfur dioxide is added, and lactic acid is produced by bacteria. Steeping is done mainly to facilitate a subsequent separation of the germ that contains the oil.

Additionally, the water from the above steeping step ("steep water") is dilute and has to be evaporated. This requires a significant amount of energy. The evaporated steep water ("corn steep liquor") is sold as such or added to the corn gluten feed, which is a low-value animal feed.

Further, the corn oil is in the germ of the corn kernel, and germ separation is a complicated process. Water with a specific density is added to the ground corn for transportation to flotation tanks or hydrocyclones, where the oil-bearing germ is separated. The germ then is sent to a series of screens, and the germ is washed with even more water. Next, the germ has to be processed, typically dewatered, usually in germ presses. The pressed germ is typically 50% moisture and 25% oil, with the remainder being germ proteins (albumins and globulins) and other minor components of corn. The germ has to be dried prior to extracting the oil.

If oil extraction is done on site, germ proteins are added to corn gluten feed, which is the lowest value product in a corn wet mill. If the germ is then sold to another processor, the germ proteins are lost. Typical corn wet milling operations recover, at best, less than 85% of the oil of corn.

SUMMARY OF THE INVENTION

Methods and apparatus for fractionation of corn are provided. In a preferred method, oil is extracted from corn or corn products or by-products with a solvent. The corn-solvent mixture is separated into streams, one of which preferably includes an extract containing at least oil and solvent, and another that contains de-oiled corn solids and adsorbed solvents. The solvent is separated from oil, and the de-oiled, desolventized corn solids are processed to provide one or more corn products.

BRIEF DESCRIPTION OF THE DRAWINGS

Other features, objects and advantages of the invention will be apparent to those skilled in the art from the following detailed description and by reference to the drawings, of which.

DETAILED DESCRIPTION

Figure 1:
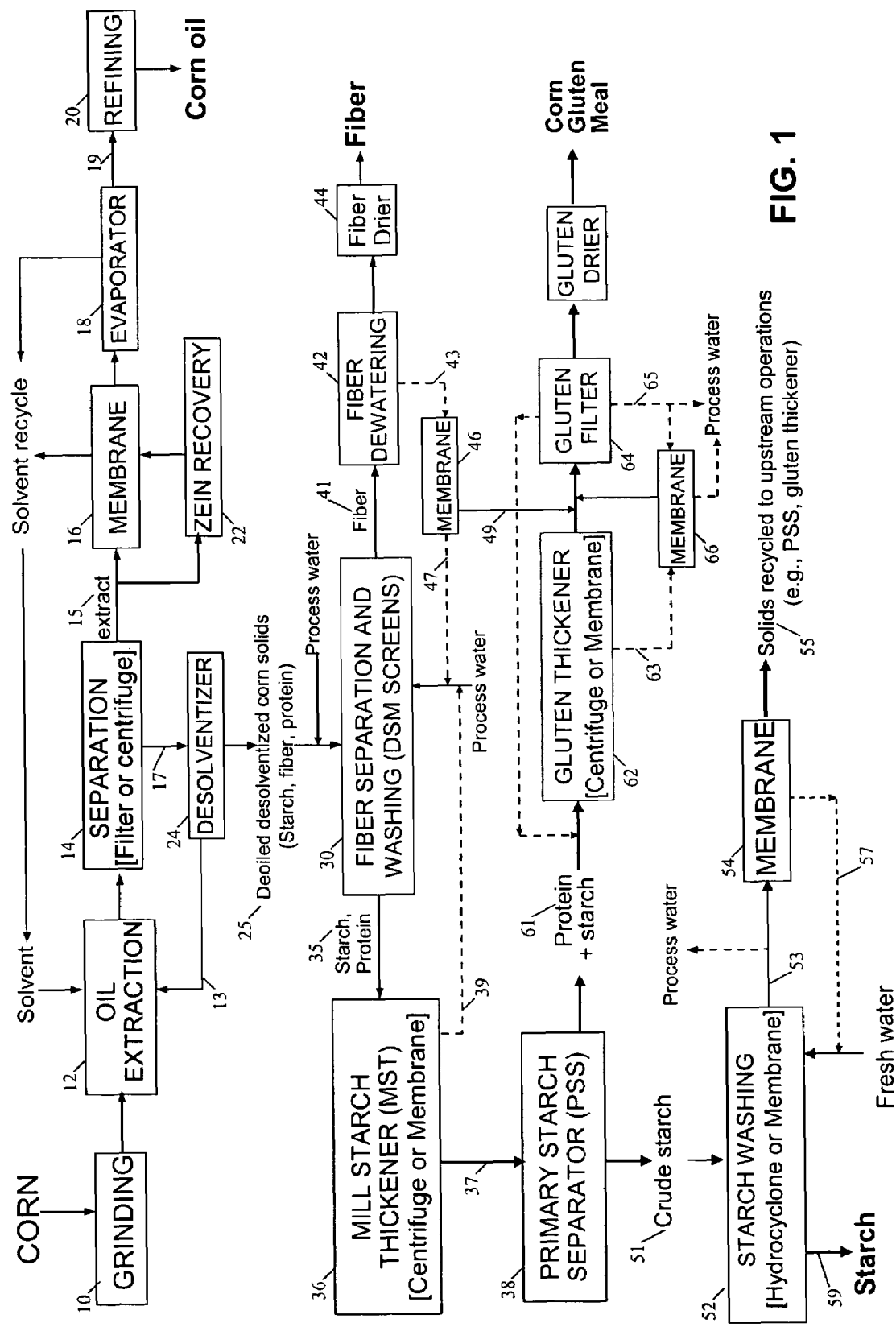
FIG. 1 is a schematic diagram showing steps in an exemplary process for corn fractionation to produce corn oil, fiber, corn gluten meal and starch according a preferred embodiment of the present invention.

Preferred embodiments of the present invention provide a method of corn fractionation, and more particularly a method of processing corn into industrial, food, feed, and/or kindred products. A preferred process overcomes several limitations of conventional corn wet milling processes by eliminating the steeping and germ handling steps, and by reducing fresh water usage.

Generally, in preferred methods, oil is extracted from corn or corn products or by-products with a solvent. The corn-solvent mixture is separated into streams, one of which preferably includes an extract containing at least oil and solvent, and another containing de-oiled corn solids and adsorbed solvent. The solvent is separated from oil, and the de-oiled, desolventized corn solids are processed to provide one or more corn products.

More particularly, in a preferred method, corn is dry-ground and reacted with organic solvent to extract oil. The oil is separated from the resultant extract and recovered from the extract using membrane technology. Zein may also be produced if the solvent is ethanol, for example. The de-oiled meal is subjected to a series of grinding and separation operations such as centrifugation, hydryocyclones, and/or membrane technology to result in one or more additional products such as corn products, corn gluten meal, corn starch, and fiber. Zein may also be recovered by re-extracting the de-oiled meal with aqueous ethanol and ultrafiltering the extract.

A method that eliminates the steeping process, and yet produces corn oil with equivalent or greater yields and without the production or handling of germ, has been described in U.S. Pat. No. 6,433,146 to the present inventor, which is incorporated herein by reference. The '146 Patent describes a method of obtaining corn oil using an organic solvent such as ethanol to extract the oil, followed by a primary separation step to filter the extract and a subsequent membrane separation to concentrate the oil in the extract and to recycle the solvent. The de-oiled corn solids residue from the primary separation step is one subject of this invention in exemplary embodiments.

Alternatively or additionally, zein protein may be partially or substantially extracted using an ethanol extraction, separation and membrane separation. The zein-free corn solids, or alternatively the de-oiled zein-free corn solids, are processed by embodiments of this invention.

In an exemplary practice of this invention, the de-oiled corn solids are mixed with process water to create a suspension including starch, fiber and protein. It is subjected to grinding and separation steps to separate the fiber from the starch and protein. The fiber is washed and dried, and the fiber wash water is recycled as process water or membrane filtered to recover the protein and starch. Then, the starch-protein suspension is subjected to an optional concentration step followed by a separation step to separate the starch from the protein. The protein fraction, containing some starch, is thickened and dewatered prior to drying. The starch is purified by washing with fresh water. The wash water containing the impurities is simultaneously separated from the starch. This wash water is used as process water or is subjected to membrane clarification and concentration to enable it to be recycled as starch wash water and to recover the solids.

According to preferred embodiments for fractionation of corn, the corn is prepared for extraction, and the oil is extracted from the prepared corn with a solvent, providing an extracted corn-solvent mixture. The extracted corn-solvent mixture is separated into at least two streams, one including an extract containing the oil and solvent, and another stream including the de-oiled corn solids and adsorbed solvent. The solvent preferably is separated from the oil in the extract. The de-oiled corn solids may be desolventized to substantially remove the solvent and provide de-oiled, desolventized corn solids. These corn solids may be resuspended in water, and one or more of fiber, starch, and protein may be separated from the corn solids to produce corn products.

Alternatively or additionally, zein may be extracted from the de-oiled corn solids with a solvent. The de-oiled corn solids-solvent mixture may be separated into at least two streams, of which one is another extract containing the zein and solvent, and the other includes the de-oiled, de-zeined corn solids and adsorbed solvent. The solvent may be separated from zein by membrane processing the extract. The de-oiled, de-zeined corn solids may be desolventized to remove the solvent, and the desolventized, de-oiled, de-zeined corn solids may be resuspended in water. Fiber, starch and protein may be separated from these corn solids.

In the above exemplary processes: for separating corn, preparing the corn for extraction may include, for example, dry-grinding or flaking the corn. The extracting may include, for example, batch or continuous extracting, and the solvent may include a hydrocarbon, an alcohol, an ethanol such as 95-100% ethanol, or a solution thereof. Separating the extracted corn-solvent mixture may include, for example, centrifugation, filtration, or membrane filtration, and separating the first solvent from the oil may include, for example, nanofiltration or ultrafiltration. Desolventizing the de-oiled corn solids or de-oiled, de-zeined corn solids may use, for example, vacuum, steam, air, and/or gas. Separating the fiber, starch, and/or protein from the de-oiled desolventized corn solids or the de-oiled, de-zeined, de-solventized corn solids may include, for example, one or more grinding or separation steps.

FIG. 1 shows a flow of a corn product extraction application of the invention to a dry mill ethanol plant. A preferred method of the present invention first extracts oil and/or zein from corn using, for example, the methods described in the '146 Patent or by other methods. Corn or corn processing by-products are the main raw material for preferred embodiments of this invention. For example, the corn inputs may include corn (e.g., whole kernel or flaked corn), corn processing by-products (e.g., DDG, DDGS (distilled dried grains with solubles), corn gluten meal, corn germ, or corn meal.

The raw material is ground and or sieved 10 to an appropriate size and shape. For example, a hammer mill or similar size reduction device, or a flaking machine is used to reduce the corn to an optimum particle size for extraction of oil with a particular solvent. If the raw material is a corn processing by-product, such as whole corn meal from a dry miller, this grinding or sieving step 10 may not be necessary. Preferably, moisture content of the corn should be 0-14% by weight.

The oil is extracted 12 using an appropriate solvent in an extractor. For example, alcohols such as ethanol, hydrocarbons such as hexane, acetone, and the like, including solutions thereof, may be used, provided the solvent efficiently extracts oil from the corn particles or flakes. The extraction may be batch or continuous extraction.

The resulting slurry including corn solids and the solvent is subjected to a separation step 14, which may be, for example, centrifugation or filtration. The slurry is separated into an extract 15 and a de-oiled residue 17. The extract 15 is processed 16 through, for example, nanofiltration or reverse osmosis membranes to separate oil and/or other extracted components from the solvent. The concentrated extract is sent to an evaporator 18 to remove the residual solvent. This removed solvent may be re-used in the extraction step 12. The crude corn oil 19 preferably is refined 20, for example using methods well known in the vegetable oil industry.

Additionally, if ethanol, isopropanol, or similar solvent for extracting oil is used, a (usually) small amount of zein may be coextracted with oil in the extraction step 12, depending on the ethanol concentration and other conditions. The zein can be recovered 22 prior to the separation step 16 by processing the extract 15 with an ultrafiltration membrane, for example, and the permeate from recovery step 22 can be sent for oil recovery in separation step 16. Exemplary methods and membranes are described in the '146 Patent.

The de-oiled corn solids 17 typically contain starch, protein, fiber, minor constituents of corn, and adsorbed solvent. These corn solids 17 are desolventized 24 by any of various methods or apparatus such as vacuum, steam, air, or gas. Heat may be applied to facilitate desolventizing the corn solids. The solvent vapor 13 may be reused in the extraction step 12.

Though it is not necessary for ethanol or other solvent to be produced in the same facility (e.g., a plant) as the extraction methods described herein, in-house ethanol may be preferred for economic reasons. For example, fermentation and distillation steps may be conducted to produce an ethanol supply for the extraction step 12. However, ethanol or other solvent for the extraction step 12 may be procured from outside sources. Costs of corn processing may be reduced by practicing extensive recycling of the solvent via the membrane step 16, the evaporation step 18, and/or the desolventizing step 24. The number of times the solvent can be recycled will depend on the level of impurities contained in the used solvent, and how it affects the extraction efficiency in the extraction step 12.

In preferred embodiments of the present invention, the de-oiled, desolventized corn solids 25 are made into a slurry by adding water, which may be either fresh water or, preferably, process water recycled from downstream operations. The amount of water added should be sufficient to efficiently conduct a fiber separation and washing step 30. This amount of water may be, for example, 1-10 parts by weight of water to one part by weight of the desolventized dry, de-oiled corn solids 25. In conventional wet milling, this is usually a ratio of 3 parts water to 1 part corn solids.

The slurry is sent to the fiber separation and washing step 30. This step is preferred to obtain maximum starch recovery while minimizing fiber in the final starch and protein products. Fiber separation and washing may include one or more individual steps, which are well known to those of ordinary skill in the art. For example, it may be optimal to first grind the de-oiled, desolventized corn solids 25 to release some of the starch from the fiber. Any of several milling devices known to those of ordinary skill in the corn wet milling art may be used to release the starch. For example, Entoleter-type mills that sling the material against pins at high speed may be used to free the starch with minimum fiber breakup. Disk mills, with counter-rotating disk mills or with only one disk rotating at high speed, can also be used.

The slurry of de-oiled, desolventized corn solids 25 preferably is separated in the fiber separating step 30 by centrifugation and/or filtration. A preferred method of fiber separation in corn milling employs a 50-70 micron wedge-wire pressure-fed screen, such as the 120 DSM screens made by Dorr-Oliver, of Milford, Conn. Wash water, usually recycled process water from other milling steps, is introduced in the last of 5-7 stages of the unit and flows counter-current to the fiber. The wash water emerges from the first fiber washing stage as an "undersize" fraction 35 with ideally all the starch and protein that was in stream 25. Washed fiber 41 from the last stage of the fiber separation step 30 is dilute, typically 5-20% solids. It is dewatered in a dewatering step 42 by mechanical devices or methods, such as by using screen centrifuges, screened reels, screw presses, belt presses, or the like. The fiber after the dewatering step 42 may be dried 44 in a drier, or may be mixed with other streams before drying.

Water 43 from the fiber dewatering step 42 may contain some starch and protein. To recover the soluble germ protein and other proteins that may be present in the fiber wash water 43, it may be sent back to the fiber separation step 30, or processed through an ultrafilter fitted with a protein-retaining membrane 46. The retained solids stream 49 from the membrane 46 can be sent to a primary starch separator step 38, to a gluten filter/drier 64, or it may be marketed as a protein product by itself. The clear permeate 47 from the membrane 46 can be used for the fiber separation step 30 or as process water.

After the fiber separation step 30, a stream 35, commonly referred to as the "mill stream", preferably contains only starch, protein (less the zein that may have been removed in the zein recovery step 22), and some soluble impurities. The solids level of the mill stream 35 may be low (typically 5%-20% starch and 0.5-2% protein). The starch and protein 35 preferably is thickened using a mill starch thickener (MST) 36. The MST 36 may be a centrifuge or a membrane filtration system, for example, as described in U.S. Pat. No. 6,648,978 to Liaw et al. The underflow (if thickened with a centrifuge) or the retentate (if thickened with a membrane) 37 may have a 20%-30% solids concentration. This level of solids may facilitate better operation of a primary starch separation step 38. The overflow or permeate 39 can be used as process water in the plant, which will also serve to recycle any solids that may be entrained in the overflow or permeate.

It may be advantageous to first pass the starch and protein stream 35 through a degritting step (not shown) prior to passing through the MST 36. The degritting step removes the relatively fine gritty materials that may be in the stream 35. Manifolded cyclone systems, for example, can be used for this purpose.

The primary starch separation step 38 separates starch from the other impurities of the underflow or retentate 37 based on density differences between the stream containing the protein and other impurities (which has a specific gravity of 1.1 or less) and the starch stream (which has a typical specific gravity of 1.6). In a preferred embodiment, disk-type nozzle centrifuges are used for the starch separation step 38, such as the BH-36B Primary Merco Centrifuge made by Dorr-Oliver. The overflow 61 is the gluten stream containing 60-70% protein on a dry basis. Gluten typically refers to the two major insoluble fractions of corn, commonly termed glutelin and zein. Gluten proteins are largely insoluble in water at normal or acidic pH. Gluten may account for up to 80% of the total nitrogen in corn.

The underflow 51 is a crude starch suspension typically containing 30-35% solids, of which the protein and other impurities is 2-5% on a dry basis. The starch underflow 51 is purified in a starch washing step 52, which preferably includes a series of hydrocyclones in multiple stages. About 1.5-3 parts by weight of water per part of dry starch are used in a preferred hydrocyclone system. Alternatively, a membrane microfiltration system such as that described by Shukla et al (Shukla, R., Tandon, R., Nguyen, M.; and Cheryan, M., Microfiltration of starch suspensions using a tubular stainless steel membrane. Membrane Technology (Elsevier), No. 120: 5-8, 2000) may be used. A preferred microfiltration system uses 1-5 feed volumes of diafiltration water for optimal purification. This starch purification step 52 preferably is the only point in the overall process where fresh water is used.

Starch wash water 53 from the starch washing step 52 may contain starch, protein and impurities. The wash water 53 can be used as process water in other steps of the overall process, or it can be processed with a membrane filter 54 to recover some or substantially all of the solids in a retentate stream 55. The retentate stream 55 can be recycled for use in the primary starch separating step 38 or to a gluten thickening step 62 depending on its composition. A permeate 57 from the membrane filter 54 preferably is clean enough to be recycled to the starch washing stage 52 if reverse osmosis or nanofiltration is used in the membrane step 54, or to the fiber washing stage 30 if an ultrafilter or microfilter is used in the membrane. In preferred embodiments of this invention, since there is no steeping of corn, the use of membrane filters 54 will reduce water usage in the plant. Typical reverse osmosis membranes include SW30 from Dow-FimTec or CPA from Hydranautics or AG from GE-Osmonics.

The output from the starch washing step 52 is a concentrated starch stream 59. This starch stream 59 may be dried or used further in the plant as needed.

The gluten (protein and starch) stream 61 resulting from the starch separation step 38 is processed in a gluten thickening step 62, which may employ a centrifuge in a conventional manner or a membrane filter, for example, as described in U.S. Pat. No. 5,968,585 to Liaw et al. The concentrated gluten stream may be sent to a gluten filter 64, and then dried for sale as corn gluten meal.

A dilute stream 63 from the gluten thickening step 62 and a dilute stream 65 from the gluten 64 may be used as process water in the plant. However, soluble germ proteins may be present in the gluten stream 61. There may thus be a significant quantity of protein in streams 63 and 65. In conventional corn wet milling, such soluble germ proteins are used for corn gluten feed, which is a low-value product. In a preferred embodiment of the invention, stream 63 and/or stream 65 is passed through an ultrafilter 66 fitted with a protein-retaining membrane to recover substantially all the protein. The recovered protein can be marketed as a corn protein fraction. The permeate from the ultrafilter 66 preferably is used as process water.

Figure 2:
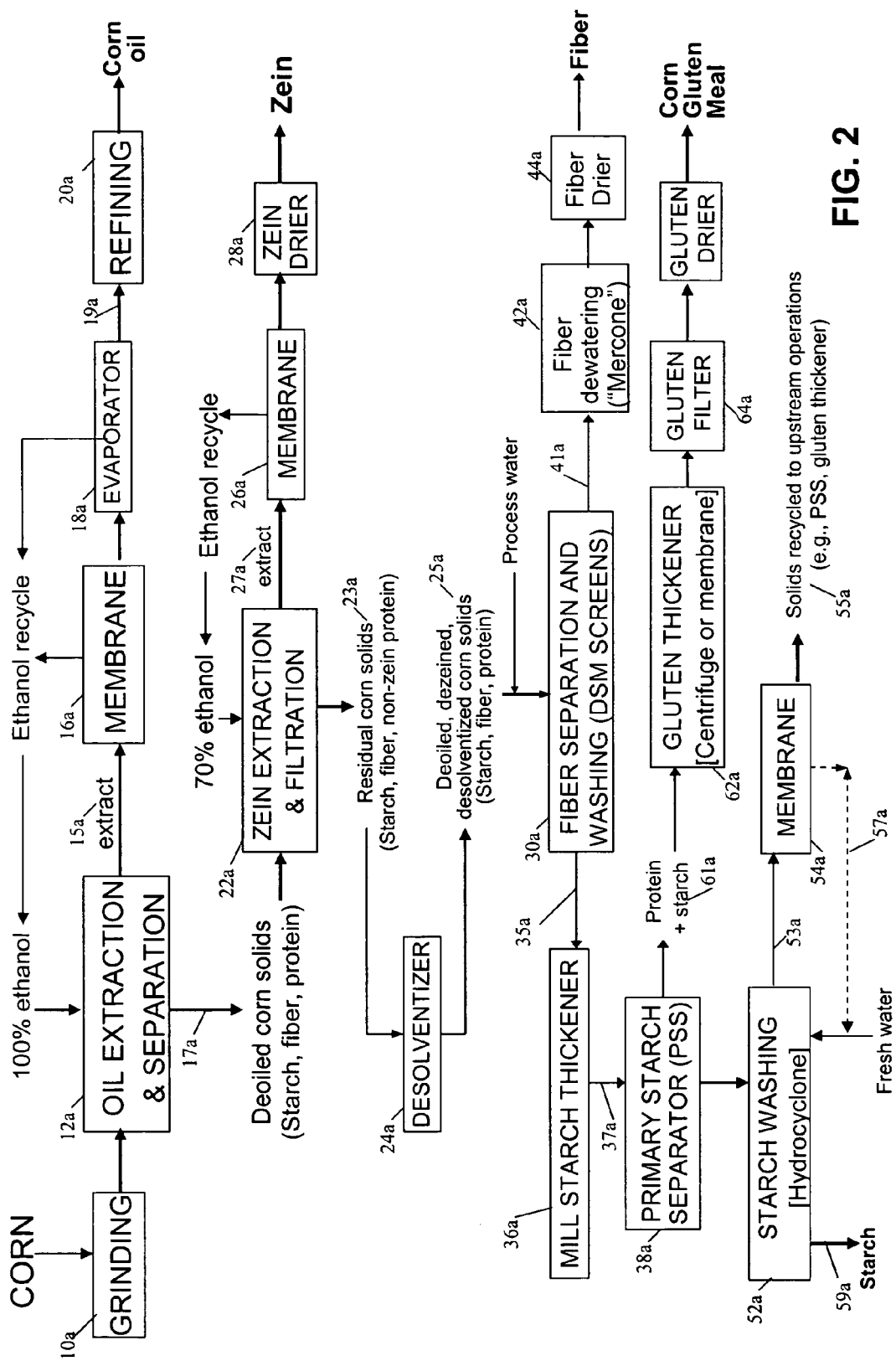
FIG. 2 is a schematic diagram showing steps in an exemplary process for corn fractionation to produce corn oil, zein, fiber, corn gluten meal and starch according to another preferred embodiment of the present invention.

Referring now to FIG. 2, a preferred process of the present invention for a plant focused on maximizing production of oil and zein is illustrated. Zein is an alcohol-soluble protein that has a multitude of uses. Steps similar to those shown and discussed with respect to FIG. 1 are labeled with like reference numerals.

Corn or corn processing by-products are the main raw material for this invention. The process for the oil extraction preferably is the same as described for FIG. 1 and shown in FIG. 2 as steps 10a through 20a. In this embodiment, de-oiled corn solids 17a are re-extracted (step 22a) with 60-90% aqueous ethanol, more preferably 65-75% aqueous ethanol in a suitable extractor. If a solvent other than 95-100% aqueous ethanol is used for oil extraction, the de-oiled corn solids 17a must be desolventized before zein extraction (this desolventizing step is not shown in FIG. 2).

After the zein extraction step 22a, the ethanol slurry is separated by filtration or centrifugation into an extract 27a and a de-oiled, de-zeined corn solids residue 23a. The extract 27a is processed through one or more ultrafiltration membranes 26a to separate the zein from the solvent and other low molecular weight impurities, as described in the '146 Patent. The concentrated zein is sent to a drier 28a.

The de-oiled, de-zeined corn solids 23a typically contain starch, protein other than zein, fiber, minor constituents of corn and adsorbed solvent, and water. The corn solids 23a are desolventized 24a by any suitable means, such as vacuum, steam, air or gas. Heat may be applied to facilitate desolventizing the corn solids 23a. The solvent vapor may be reused in the extraction step 22a.

Similar to the process shown in FIG. 1, resultant de-oiled-de-zeined-desolventized solids 25a containing mainly starch, fiber and nonzein protein are processed to remove fiber and starch as illustrated in steps 30a-64a, which are similar to the steps illustrated in FIG. 1.

Preferred embodiments of the invention provide efficient, flexible and simple processes for production of several products from corn. Further, a preferred process eliminates steeping of corn, which is one of the most troublesome and unpredictable steps in the conventional corn wet milling process, and thus eliminates associated operations such as steep water evaporators. Also preferably eliminated is the loss of corn solids that occurs due to leaching into the steep water.

Germ handling and separation preferably is completely eliminated. Crude corn oil is produced rather than germ, thus ensuring a higher value to the corn processor. In addition, germ proteins may be retained for more valuable use rather than being lost with the germ (if the germ is sold to an outside oil processor) or put into corn gluten feed. Preferably, germ proteins can be incorporated into corn gluten meal, which is a higher-value coproduct, or marketed as a separate product.

The volume of low-value corn gluten feed preferably is reduced or eliminated. In a traditional corn wet mill, corn gluten feed is typically 21% protein (dry basis). This low-value product is used as a repository for otherwise unmarketable components or by-products or waste matter generated in a corn wet mill. Examples include corn steep liquor, fiber, germ proteins, "mud" from the clarification of dextrose, fermentation by-products, filter aid, and the like. Such a product may also be produced in embodiments of this invention by blending the fiber with the protein streams if needed. A substantially pure corn fiber may also be generated, which may have higher market value than if it is incorporated into corn gluten feed.

Further, preferred embodiments of the invention reduce fresh water usage in the plant by using membrane technology in several places in the process train, and most preferably membrane technology is used to recover water and solids from the starch washing stage.

The various embodiments described in the present invention should not be construed as being restrictive in that other modifications, substitutions and alternatives to specific equipment and methods are possible and would be appreciated by those of ordinary skill in the art. For example, it should be understood that "membrane" refers to the appropriate membrane, whether it is microfiltration, ultrafiltration, nanofiltration, or reverse osmosis. Further, it should be understood that diafiltration may be used when necessary to purify the solids, and that combinations of these membrane techniques may be used. It will be further understood that specific corn products can be selected for production, and thus it may not be necessary to produce all available products in a particular process, nor to perform all steps to make such corn products available. Also, it should be understood that, though preferred embodiments of the present invention provide several opportunities for recycling of ethanol and/or process water, the present invention is not to be limited to processes that recycle at all possible steps.

While various embodiments of the present invention have been shown and described, it should be understood that other modifications, substitutions, and alternatives are apparent to one of ordinary skill in the art. Such modifications, substitutions and alternatives can be made without departing from the spirit and scope of the invention, which should be determined from the appended claims.

Various features of the present invention are set forth in the pending claims.

What is claimed is:

1. A process for fractionation of corn, the process comprising the steps of:
   preparing the corn for extraction;
   without separating germ from the prepared corn, extracting oil from the prepared corn with a solvent to provide an extracted corn-solvent mixture;
   separating the extracted corn-solvent mixture into at least two streams, one including an extract comprising the oil and the solvent, and the other comprising de-oiled corn solids and adsorbed solvent;
   membrane processing the extract to separate the solvent from the oil;
   desolventizing the de-oiled corn solids from the other stream to substantially remove the solvent and provide de-oiled, desolventized corn solids;
   resuspending said de-oiled, desolventized corn solids in water; and
   separating one or more of fiber, starch and protein from the suspended de-oiled, desolventized corn solids to produce one or more corn products.

2. The process of claim 1 wherein the solvent comprises at least one of a hydrocarbon, an alcohol, hydrocarbon combined with water, and an alcohol combined with water.

3. The process of claim 1 wherein said separating the extracted corn-solvent mixture comprises at least one of centrifugation, filtration, and membrane filtration.

4. The process of claim 1
wherein the extract comprising the oil and solvent is pretreated with an ultrafiltration membrane, and
wherein the process further comprises nanofiltering a permeate from the ultrafiltration membrane to recover oil and solvent.

5. The process of claim 1 further comprising:
separating fiber from the resuspended desolventized, de-oiled corn solids; and
washing the separated fiber.

6. The process of claim 5 further comprising:
dewatering and drying the separated and washed fiber.

7. The process of claim 6 wherein the wash water from said fiber dewatering is membrane filtered to recover protein and starch.

8. The process of claim 6
wherein the de-oiled, desolventized corn solids after said fiber separating comprise a suspension including substantially starch and protein in water, and
wherein the process further comprises dewatering and thickening the separated fiber by at least one of a centrifuge, a membrane microfilter, and a membrane ultrafilter.

9. The process of claim 8 wherein the suspension is separated into crude starch and protein fractions.

10. The process of claim 9 further comprising:
washing and purifying the crude starch using water.

11. The process of claim 10 wherein said washing and purifying uses at least one of a hydrocyclone and a membrane microfilter.

12. The process of claim 11, further comprising:
passing the wash water from said starch purifying through at least one of a membrane, a reverse osmosis membrane, a nanofiltration membrane, an ultrafiltration membrane and a microfiltration membrane, to recover clean water and permeate and concentrated solids.

13. The process of claim 12 wherein the clean water permeate from said passing is recycled to upstream operations.

14. The process of claim 13 further comprising:
recycling retained solids from said passing to upstream operations to recover the solids.

15. The process of claim 9 further comprising:
thickening the separated protein fraction in a gluten thickener;
wherein the gluten thickener includes at least one of a centrifuge, a membrane microfilter, and an ultrafilter designed to retain substantially all proteins and starch.

16. The process of claim 15 wherein said thickening uses a centrifuge, and wherein the overflow from the centrifuge is sent to at least one of a membrane microfilter, an ultrafilter, and a nanofilter to recover substantially all the protein.

17. The process of claim 15
wherein said thickening uses a gluten filter; and
wherein the process further comprises membrane processing a filtrate from the gluten filter using at least one of reverse osmosis, nanofiltration, ultrafiltration, and microfiltration to recover protein.

18. The process of claim 1
wherein said preparing comprises reducing a particle size of the corn;
wherein the prepared corn is not steeped before said extracting oil.

* * * * *

UNITED STATES PATENT AND TRADEMARK OFFICE
CERTIFICATE OF CORRECTION

| | |
|---|---|
| PATENT NO. | : 7,569,671 B2 |
| APPLICATION NO. | : 11/327166 |
| DATED | : August 4, 2009 |
| INVENTOR(S) | : Cheryan |

Page 1 of 1

It is certified that error appears in the above-identified patent and that said Letters Patent is hereby corrected as shown below:

<u>In the Claims</u>:

Col. 10, Line 6           Delete "clean water and permeate" and insert

Claim 12                   --a clean water permeate-- in its place.

Signed and Sealed this

Tenth Day of November, 2009

David J. Kappos
*Director of the United States Patent and Trademark Office*